(12) United States Patent
Grier et al.

(10) Patent No.: US 9,848,311 B1
(45) Date of Patent: Dec. 19, 2017

(54) SYSTEM AND METHOD FOR MANAGING COMMUNICATIONS

(71) Applicant: Catalyst Communications Technologies, Forest, VA (US)

(72) Inventors: Robin W. Grier, Forest, VA (US); John M. Schools, Roanoke, VA (US); Darren R. Carlund, Lynchburg, VA (US)

(73) Assignee: Catalyst Communications Technologies, Forest, VA (US)

( * ) Notice: Subject to any disclaimer, the term of this patent is extended or adjusted under 35 U.S.C. 154(b) by 0 days.

(21) Appl. No.: 14/814,595

(22) Filed: Jul. 31, 2015

Related U.S. Application Data

(60) Provisional application No. 62/032,049, filed on Aug. 1, 2014.

(51) Int. Cl.
| | |
|---|---|
| *H04B 7/00* | (2006.01) |
| *H04W 4/22* | (2009.01) |
| *H04W 16/26* | (2009.01) |
| *H04W 84/08* | (2009.01) |
| *H04W 88/06* | (2009.01) |

(52) U.S. Cl.
CPC ............ *H04W 4/22* (2013.01); *H04W 16/26* (2013.01); *H04W 84/08* (2013.01); *H04W 88/06* (2013.01)

(58) Field of Classification Search
CPC ..... G06Q 10/06; G06Q 10/10; H04L 67/1095
USPC .......... 455/7, 13.1, 521, 520, 515, 516, 423, 455/456.1, 404.1, 426.1, 518, 519, 403, 455/563, 11.1, 405; 370/316, 259, 392, 370/401, 254, 431, 464; 340/539.18, 531, 340/539.13, 539.2, 572.1; 382/115; 705/7.12, 8, 1, 9, 204, 325; 704/246; 250/559.48

See application file for complete search history.

(56) References Cited

U.S. PATENT DOCUMENTS

| | | | | |
|---|---|---|---|---|
| 4,144,497 A | * | 3/1979 | Andrea, III | H04B 7/15542 455/11.1 |
| 4,553,263 A | * | 11/1985 | Smith | H04W 84/00 455/17 |
| 5,193,091 A | * | 3/1993 | Crisler | H04J 3/12 370/336 |
| 5,857,144 A | * | 1/1999 | Mangum | H04W 84/08 455/11.1 |
| 6,021,326 A | * | 2/2000 | Nguyen | H04Q 3/002 455/422.1 |
| 6,785,511 B1 | * | 8/2004 | Hengeveld | H04B 7/2606 455/16 |

(Continued)

*Primary Examiner* — Tan H Trinh
(74) *Attorney, Agent, or Firm* — New River Valley IP Law, PC; Michele L. Mayberry; Timothy D. Nolan

(57) ABSTRACT

A system for managing communications is described, where embodiments comprise a mobile radio control station component capable of supporting multiple frequency bands and a computing device. The computing device comprises a processor, a computer-readable memory, and a set of computer-executable instructions. The set of computer-executable instructions are configured to provide a vehicular repeater, a local repeater, an Interoperability Gateway, a call recorder, and a graphical user interface. The computing device is in operable communication with the mobile radio control station component. A method of establishing an advanced audio patch between multiple radios is also described.

26 Claims, 12 Drawing Sheets

(56) References Cited

U.S. PATENT DOCUMENTS

| | | | |
|---|---|---|---|
| 7,489,698 B2* | 2/2009 | Blossom | H04M 3/5307 370/401 |
| 7,676,228 B2 | 3/2010 | Olivier et al. | |
| 7,792,899 B2* | 9/2010 | Shaffer | H04L 67/22 455/414.1 |
| 8,027,316 B1* | 9/2011 | Barrow | H04W 4/10 370/335 |
| 8,059,613 B1* | 11/2011 | Barrow | H04W 76/005 370/335 |
| 8,145,249 B2* | 3/2012 | Shaffer | H04L 65/605 370/338 |
| 8,249,102 B2* | 8/2012 | Koren | H04L 65/4061 370/466 |
| 8,260,338 B2* | 9/2012 | Shaffer | H04W 4/021 455/518 |
| 8,275,404 B2* | 9/2012 | Berger | G06Q 10/06 455/404.1 |
| 8,280,364 B1 | 10/2012 | Sennett et al. | |
| 8,346,263 B2 | 1/2013 | Olivier et al. | |
| 9,271,311 B1* | 2/2016 | Gurney | H04W 76/007 |
| 2003/0081796 A1* | 5/2003 | Bray | H04B 1/20 381/86 |
| 2004/0023635 A1* | 2/2004 | Impson | H04L 12/66 455/404.1 |
| 2005/0001720 A1* | 1/2005 | Mason | G01C 21/206 340/539.13 |
| 2005/0170808 A1* | 8/2005 | Hamilton | H04L 12/2854 455/404.1 |
| 2005/0245232 A1* | 11/2005 | Jakober | G08B 27/005 455/410 |
| 2005/0251405 A1* | 11/2005 | Kreiner | G06Q 10/10 709/205 |
| 2005/0273330 A1* | 12/2005 | Johnson | G10L 19/0018 704/246 |
| 2006/0019655 A1* | 1/2006 | Peacock | H04W 92/02 455/426.1 |
| 2006/0158329 A1* | 7/2006 | Burkley | H04W 76/007 340/539.13 |
| 2006/0209828 A1* | 9/2006 | Ng | H04L 63/04 370/392 |
| 2006/0211404 A1* | 9/2006 | Cromp | G06Q 10/06 455/405 |
| 2007/0021132 A1* | 1/2007 | Jin | H04W 4/10 455/518 |
| 2007/0055559 A1* | 3/2007 | Clawson | G06Q 10/04 705/325 |
| 2007/0103292 A1* | 5/2007 | Burkley | G07C 9/00111 340/539.13 |
| 2007/0103294 A1* | 5/2007 | Bonecutter | G08B 21/10 340/539.18 |
| 2008/0037461 A1 | 2/2008 | Biltz et al. | |
| 2008/0175356 A1* | 7/2008 | Seidberg | G08B 25/08 379/45 |
| 2008/0189360 A1* | 8/2008 | Kiley | G06F 17/30867 709/203 |
| 2008/0207241 A1* | 8/2008 | Namm | H04W 4/08 455/518 |
| 2008/0280637 A1* | 11/2008 | Shaffer | H04L 41/069 455/519 |
| 2009/0067586 A1* | 3/2009 | Fano | H04M 3/51 379/49 |
| 2010/0144383 A1* | 6/2010 | Berger | G06Q 10/06 455/521 |
| 2010/0159824 A1* | 6/2010 | Goodjohn | H04W 72/0453 455/11.1 |
| 2010/0159976 A1* | 6/2010 | Marocchi | H04W 4/08 455/519 |
| 2010/0161728 A1* | 6/2010 | Drozt | G06Q 10/10 709/204 |
| 2011/0001795 A1* | 1/2011 | Uhm | H04W 4/02 348/46 |
| 2011/0034145 A1* | 2/2011 | Youn | H04W 4/22 455/404.1 |
| 2011/0087510 A1* | 4/2011 | Putra | G06Q 10/00 705/7.13 |
| 2011/0117835 A1* | 5/2011 | Bohn | H04W 72/005 455/18 |
| 2011/0275364 A1* | 11/2011 | Austin | H04L 41/12 455/423 |
| 2012/0040635 A1* | 2/2012 | Boucher | H04W 4/22 455/404.2 |
| 2012/0092992 A1* | 4/2012 | Pappas | H04L 47/2491 370/235 |
| 2012/0264394 A1* | 10/2012 | Miller | G06Q 10/06 455/404.1 |
| 2013/0034090 A1* | 2/2013 | Thomas | H04W 48/04 370/338 |
| 2013/0078908 A1* | 3/2013 | Smith | H04B 7/155 455/11.1 |
| 2013/0078909 A1* | 3/2013 | Smith | H04B 7/155 455/11.1 |
| 2013/0157708 A1* | 6/2013 | Economy | H04W 48/18 455/518 |
| 2013/0171955 A1* | 7/2013 | Makhlouf | H04W 52/244 455/404.1 |
| 2013/0197951 A1* | 8/2013 | Watson | G06Q 10/06 705/7.12 |
| 2014/0148115 A1* | 5/2014 | Ibbotson | H04W 24/04 455/404.1 |
| 2014/0365390 A1* | 12/2014 | Braun | G06Q 50/265 705/325 |
| 2015/0063202 A1* | 3/2015 | Mazzarella | H04B 7/18504 370/316 |
| 2015/0081790 A1* | 3/2015 | Ogawa | G06F 17/30595 709/204 |
| 2015/0162974 A1* | 6/2015 | Trook | H04B 1/525 455/19 |
| 2015/0312772 A1* | 10/2015 | Agulnik | H04W 8/18 370/338 |
| 2015/0350859 A1* | 12/2015 | Hiben | H04W 4/22 455/404.1 |
| 2015/0356793 A1* | 12/2015 | Dietz | G07C 5/00 701/1 |

* cited by examiner

SYSTEM AND METHOD FOR MANAGING COMMUNICATIONS

CROSS-REFERENCE TO RELATED APPLICATIONS

This application relies on the disclosure of and claims priority to and the benefit of the filing date of U.S. Provisional Application No. 62/032,049, which provisional application was filed Aug. 1, 2014, the disclosure of which is incorporated by reference herein in its entirety.

BACKGROUND OF THE INVENTION

Field of the Invention

The present disclosure relates to the field of emergency communications. More particularly, the present disclosure relates to a system and method for managing emergency communications that enhance the capabilities of a mobile radio control station component capable of supporting multiple frequency bands by providing a vehicular repeater, a local repeater, an Interoperability Gateway, a call recorder and a graphical user interface.

Description of Related Art

In the post-9/11 world, there is a pressing need for systems for managing communications from diverse sources during an emergency incident such as fire, police, and EMS so that agency resources may be coordinated quickly and effectively. Some solutions solely provide interoperability solutions for disparate communication systems (patch audio paths). Other solutions provide extension of network coverage (vehicular repeater). Previous deployable solutions do not include a customizable graphical interface and have very limited configurability making them difficult to use and consequently less useful. Previous solutions include those described in U.S. Pat. Nos. 7,489,698; 7,676,228; 8,346,263; and 8,280,364, and U.S. Patent Application Publication No. 20080037461, each of which is incorporated by reference herein in its entirety as well as existing products such as ICRI by Communications Applied Technologies, Digital Vehicular Repeater by FutureCom, Vizor by Codan, and ACU-2000IP by Raytheon. Further, existing communications systems drop part or all of the voice information when the trunked systems fails to provide immediate channel access or attempt to buffer the audio for a fixed amount of time that could be too long (disruptive) or too short (dropping syllables or words). Thus, there is a need in the art for improved systems for managing communications.

SUMMARY OF THE INVENTION

Embodiments of the present disclosure provide an easy to use, configurable, emergency communications system and method (also called Incident Commander Element, or ICE) in a deployable package that allows a non-technical incident commander or other first responder to create interoperability, extend network coverage, and dispatch remotely while providing historical recording of all communication activity. Embodiments of ICE simplify access to and interoperability of large numbers of channels across the five primary frequency bands used by public safety and integrate tools to efficiently document voice transmissions and rapidly gain access to that information during and after the event.

Embodiments of the present disclosure further provide a system and method which combines a dispatch station with an Interoperability Gateway with a vehicular repeater in a mobile field deployable package. Embodiments of the system and method use patching of common off the shelf mobile radios already owned by the user to create a repeater in a mobile field deployable package. Embodiments of the present disclosure combines two way radios into a solution that can be used as a rapidly reconfigurable local repeater, vehicular repeater, Interoperability Gateway, and communications device. Embodiments also provide an on-scene tool for recording of radio traffic including audio and text messaging. This information can be reviewed during and after the incident. Further provided is a graphical interface that permits a user to manage the situation via monitoring traffic from groups and/or individuals and respond back as required with minimal interaction with a user interface. Embodiments permit dispatch capability on scene and at the main communications system in one embodiment and permit a complete solution for all of the incident commander's communication needs. Embodiments of the present disclosure combine a vehicular and local repeater, Interoperability Gateway, and remote and local dispatch capability in a field deployable solution for incidents.

In one aspect, embodiments of the present disclosure serve as an integrated solution for Talk Around voice communications. A plurality of multi-band radios can be controlled from a single computing device and patched in any combination for Project 25 (P25), EDACS, DMR, Opensky, SmartNet, MDC1200, Cellular Broadband PTT, and Conventional transmissions. The present system and method allows a user to scan between 800 MHz, 700 MHz, UHF, VHF, and Low Band. Further, in embodiments, ICE has integrated within it an Instant Call Recorder, a Chronological Call History List with Unit ID, Emergency Signaling, and Alert Messages.

In another aspect, embodiments of the system and method of this disclosure also provide the capability of a Digital Vehicular Repeater which can pass audio from Simplex Talk Around to the trunking system, dynamically manage the flow of the audio so syllables are not lost, record the voice locally, and store a chronological list of call records for both talk around and trunked calls. Further, embodiments provide an intelligent interface with Unit ID and alias and Emergency, and allow a user to select any Group, Channel, or System. The Queued Call Message provides for management of audio so syllables are not lost. Further, embodiments of the system work with P25, EDACS and conventional, and provides OpenSky Support.

Embodiments also provide enhanced graphics and control for radio voice communications across multiple frequency bands for Project 25, EDACS™ SmartNet™, MDC 1200, DMR, OpenSky, cellular broadband PTT, and conventional. Embodiments also provide a rugged and compact solution which provides essential information for fire-ground, emergency medical, special rescues, utility restoration and other public safety and critical infrastructure incidents. A single computing device and a plurality of mobile radios provide the control and user interface that can be operated in stand-alone mode or linked back to the agency's main radio system and to other radio channels as needed. In addition to dispatch capabilities it can be configured to act as a local repeater, vehicular repeater, and/or Interoperability Gateway simultaneously.

When fire fighters or other public safety or critical infrastructure officials choose to operate their two-way radios in talk-around or local repeat mode, it can be difficult to coordinate in the absence of communication with the main dispatch center. Embodiments of the present system and method allows the Incident Commander to monitor voice communications from these radios across the primary frequency bands using one integrated tool. Commanders see a chronological list of which radio placed each call with a time stamp. Emergency messages are highlighted and saved on the device and can be managed from it. The audio can be recorded, saved locally, and replayed on-scene or later. Pre-programmed alert voice messages or tones can be broadcast with a single button press on the GUI.

By choosing a multi-band radio as an integral control station component, agencies are able to support multiple frequency bands in a single transceiver. The ideal multi-band radio is a full-spectrum radio than can instantly scan between Low Band, VHF, UHF-L, UHF-H, 700, and 800 MHz frequencies. Said radio would also support DES and AES standard encryption, and supports a multiplicity of signaling standards like Project 25 Phase 1 and 2 as well as EDACS and conventional. When space or power is limited, using a multi-band radio with the Catalyst ICE software package can save resources and provide the flexibility to communicate quickly across the full range of channels and scenarios.

In embodiments, ICE can link two mobile radios together to patch Talk Around traffic to the local trunked radio system and can dynamically manage the audio flow so that syllables are not lost. Trunked radio systems, including cellular telephone systems, vary in the amount of time it takes to gain access to a channel. Other solutions drop part or all of the voice information when the trunked systems fail to provide immediate channel access. Other solutions attempt to buffer the audio for a fixed amount of time that could be too long (disruptive) or too short (dropping syllables, words, or entire PTTs). In certain embodiments, ICE gets the message from the trunked system indicating when the call has been assigned to a channel and hence it is safe to transmit. ICE stores the audio until this message is received and then transmits it to the trunked system.

The present system and method can link a plurality of mobile radios together to provide interoperability between radios using different frequency bands or technologies. For instance, public safety officials from different agencies might respond to the same incident with radios using VHF, 700 MHz, and 800 MHz frequency bands. The assigned channel on each of these bands can be dynamically selected and patched together locally. Similarly disparate trunking systems could be patched together. All calls on each entity are then logged and time-stamped in a common format. An integrated control station can even be linked back to the central radio switch allowing greater access to a multitude of channels and talk groups and remote monitoring by the dispatch center. Wireline technologies that allow this infrastructure level connection include the Project 25 standard known as the Console Subsystem Interface (CSSI) and the Digital Mobile Radio Standard known as the Application Interface Standard (AIS).

When public safety officials are operating outside of their normal coverage area, their portable radios have limited talk-back range since the transmitter power is lower than a mobile radio. Embodiments of the present system and method allow a local repeater mode where the Incident Commander to rebroadcast transmissions from local units at a higher power on a different frequency. When the portables are set to local repeater mode coverage is extended and they can communicate with one another over a larger area.

When public safety officials are operating in talk-around or local repeater mode, their conversations can go unrecorded. ICE provides the option to record the currently monitored channel on the local device. In embodiments, one week of actual talk time through a mobile radio can be stored on ICE, allowing for simple review and sharing during the incident or afterwards.

By using a computer, a single processor can control certain mobile radios (i.e. Harris' Unity Mobile, also called the XG-100M, which is a single mobile radio that can be instantly switched between any of hundreds of channels on the VHF, UHF, 700 MHz, and 800 MHz bands), record radio traffic and Meta data, and provide a user friendly graphical interface. The standard ICE product is offered in multiple configurations, ranging from a single radio version to a multi-radio version. In each case the product consists of Catalyst software, the mounting brackets for the mobile radios, and ac/dc power interface, and can be packaged in a travel case or permanently mounted in a vehicle or other structure.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

DETAILED DESCRIPTION OF VARIOUS EMBODIMENTS OF THE INVENTION

Figure 1:
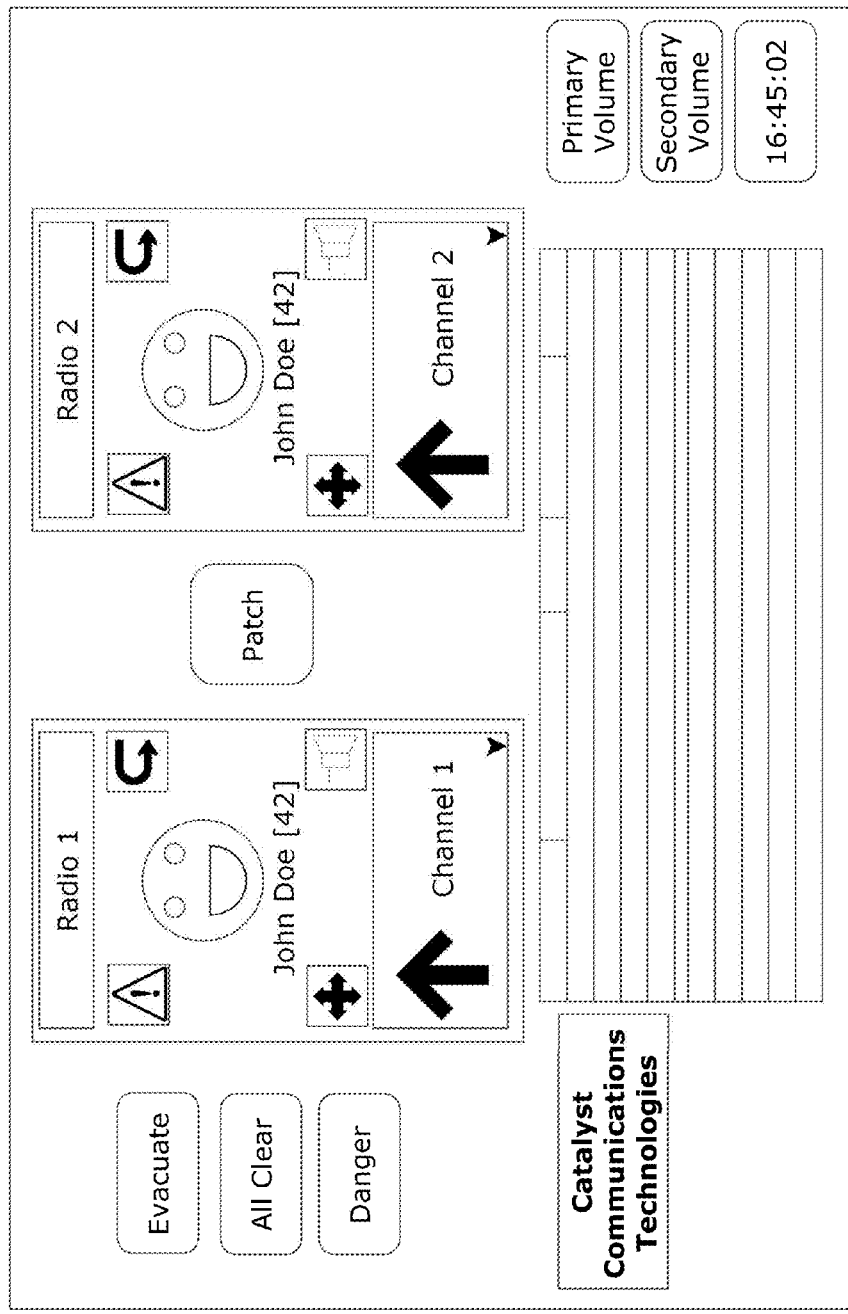
FIG. 1 is a schematic diagram showing a GUI embodiment of this disclosure for two radios.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

The following provides a list of components and features of the present system and method.

ICE Component and Feature List

In embodiments, the system of this disclosure may include a computer (such as a Laptop, desktop, etc.). Selection of the type of computing device is dependent on size of desired system. At a minimum, the computer comprises at least one processor, a form of computer-readable memory, and one or more sets of computer-executable instructions configured for performing the operations described herein. The computer may also include a display. Further, the system may include a wireless or wired data connection card for network communications (such as a Cellular wireless data modem, satellite phone, WIFI card, Ethernet cable, etc.) Any manufacturer that provides network connectivity to the main communications system is acceptable. Further, in embodiments, the system may connect any number of communication devices (such as Public Safety Radio, Cellular Phone, etc.) and virtually any device is acceptable. A resulting feature set will be affected by the degree to which the communications device(s) can be controlled.

The system may also include antennas and antenna cabling as required by communication devices (such as Band specific radio antenna, etc.) This is manufacturer and product specific. Additionally, embodiments of the system may include cabling to connect communications devices to the computer (such as Serial cable, audio cable, etc.). Cable may be common off the shelf or custom made as required by individual communications device. Further included in embodiments of the system is a power supply for computer and radios as may be required by each device. Devices may be battery operated (such as a Laptop power supply, radio power supply, etc.) The system may be powered by AC and/or DC sources depending on desired operation.

Preferred Embodiment Configuration of Components

In a preferred embodiment, each individual radio is connected to the computer via the appropriate cables for the specific manufacturer. The cables can provide digital data and analog or digital audio depending on the specific radio. Said cables can be common off the shelf type cables or custom made to fit a particular application. The computer is the on-scene user's station. The wireless cellular modem, Ethernet port, or WIFI card, etc. may be used to connect the on-scene station with the main communications system. If the specific radio is capable of digital audio, audio will remain digital without conversion to analog format as it is passed between local radios and back to the main communications system.

One or more sets of computer-executable instructions or programs running on the computer are used to display information to the user, play audio to the user, control each radio, connect to the central network, record audio, record text messaging, record coordinates of other first responders as they move through the scene, and record other messages. Said programs are also used to configure and control embodiments of the system as desired by a user at the scene. See the following list of features available to the user. The computer-executable instructions may be organized into routines, subroutines, procedures, objects, methods, functions, or any other organization of computer-executable instructions that is known or becomes known to a skilled artisan in light of this disclosure, where the computer-executable instructions are configured to direct a computer or other data processing device to perform one or more of the specified processes and operations described herein. The computer-executable instructions may be written in any suitable programming language, non-limiting examples of which include C, C++, C#, Visual Basic, Java, Python, Perl, PHP, and JavaScript.

Feature List

Additionally, the system may include a graphical user interface (GUI) which may include a Console display which provides essential information for fire-ground, emergency medical, special rescues, utility restoration and other public safety and critical infrastructure incidents. The GUI may also include a chronological list of all communications at the incident, including but not limited to voice, text, and radio control functions.

Additionally, the GUI allows an Incident Commander to provide direct voice, text, graphics, video, location, and other data communications between commander and field units through the computer-executable instructions. Of particular note is the "Respond" feature that allows the Incident Commander (IC) to press a single button and ICE tunes to the specific frequency using the correct communications device and selects that device so that all the IC needs to do is press the Push-to-Talk button and speak. Optionally the device can be configured with a customer specific voice recording or digital message to acknowledge the particular transmission.

Further, the GUI provides a way to exchange other information with field units through the computer-executable instructions. (The IC can send pre-configured Alert Messages to the field units—either audible tones or prerecorded voice messages like "evacuate immediately." It is also possible for the IC to support digital messages between the field radios and ICE such as the heart rate of a first responder or the amount of oxygen remaining in a firefighter's tank.)

Further, in its chronological list of calls the GUI provides details about each communication, encompassing but not limited to called unit ID, caller unit ID, time of call, type of call, group ID of call (when applicable), emergency status, and text message contents (when applicable).

Still further, the computer-executable instructions can provide for any one or more of the following features (enumerated below):

1. Network mode—If network connectivity is available all operations are available to other individuals on the network. All local calls can be seen and heard by network users. Network users can place calls on local system in same manner as dedicated network resources.

2. Local Audio recording—All audio transmitted or received on the local system is recorded and can be replayed on the scene or later. The system is also capable of uploading these locally recorded audio sessions to a main communications system when network connectivity with the main communications system is available or becomes available.

3. Interoperability—Audio can be patched between disparate radio systems.

4. Audio from one or more incompatible sources (different frequencies and/or technologies) can be routed to each other so that they can talk to each other without loss of content.

5. When in network mode the audio from the network can be routed into and out of the local system to permit all network users to communicate without loss of content.

6. Local Repeater—Local communications can be rebroadcast at higher power to provide extended coverage for users on the scene.

7. Vehicular Repeater—Can be used to relay local traffic to and from the network system via a network radio's RF link.

8. Automation and simplification of the above. Using software we can simplify the configuration and operation of the device so that a lay person can make use of its powerful capabilities quickly and under stress.

The following describes three embodiments of the system of this disclosure:

First Embodiment: Incident Command Management

In this embodiment the invention is used to provide Dispatch Console functions on-scene to the incident commander responsible for the emergency personnel responding to the incident. This embodiment allows the commander to coordinate personnel from disparate units that are using incompatible and different communication devices. All traffic is recorded locally as a record of the incident.

Second Embodiment: Network Link

In this embodiment the invention is used to provide a communications link between the field personnel and the main communications system. Local communications are routed to the main communications system via a radio on said system that is connected to the ICE, thereby allowing the incident to be managed by the main dispatch center and recorded there and for other responders outside of the scene to participate in the communications. This also can be used to link an orphaned site which has lost its connection to the main system by having one radio in the embodiment on said orphaned site and the other radio on the main communications system. All other configurations remaining the same.

Third Embodiment: Network Extender

In this embodiment the invention is used to create network coverage via a data connection in an area that does not otherwise have coverage. The invention becomes a node on the main communication system's network. This embodiment allows the incident to be managed by the main dispatch center. The incident communication system is now accessible by the dispatch center but also the resources of the main communications system are accessible by the users of the incident system.

Turning now to the figures, FIG. 1 shows a GUI embodiment of this disclosure. The GUI displays a chronological list of recorded calls as well as the identity of callers and their specific radio channels.

Figure 2:
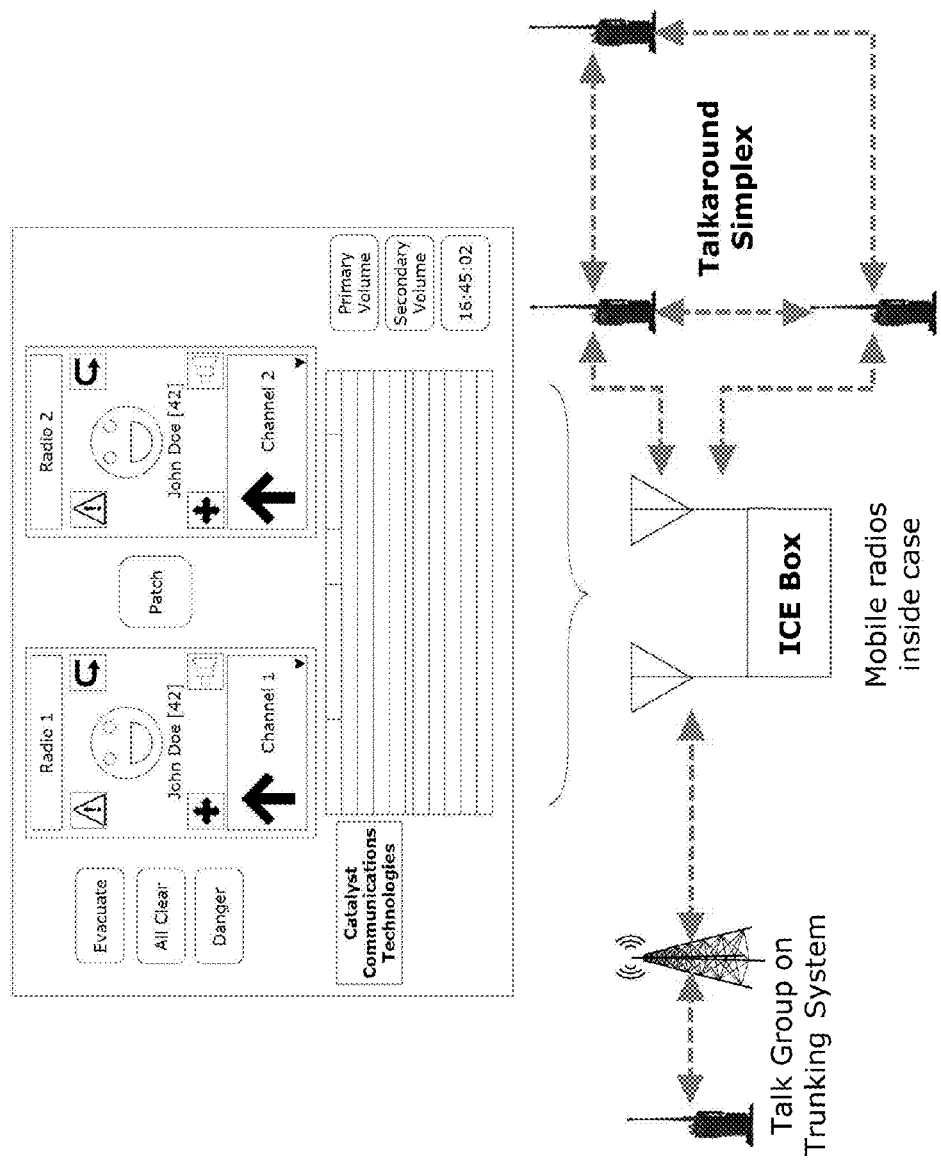
FIG. 2 is a schematic diagram showing an ICE Digital Vehicular Repeater Application embodiment of this disclosure.

FIG. 2 shows an ICE Digital Vehicular Repeater Application embodiment of this disclosure. ICE passes audio from Simplex Talk around to the trunking system. ICE dynamically manages the flow of the audio so syllables are not lost. ICE also records the voice locally (1 week's capacity). ICE stores a chronological list of call records for both talk around and trunked calls.

Figure 3:
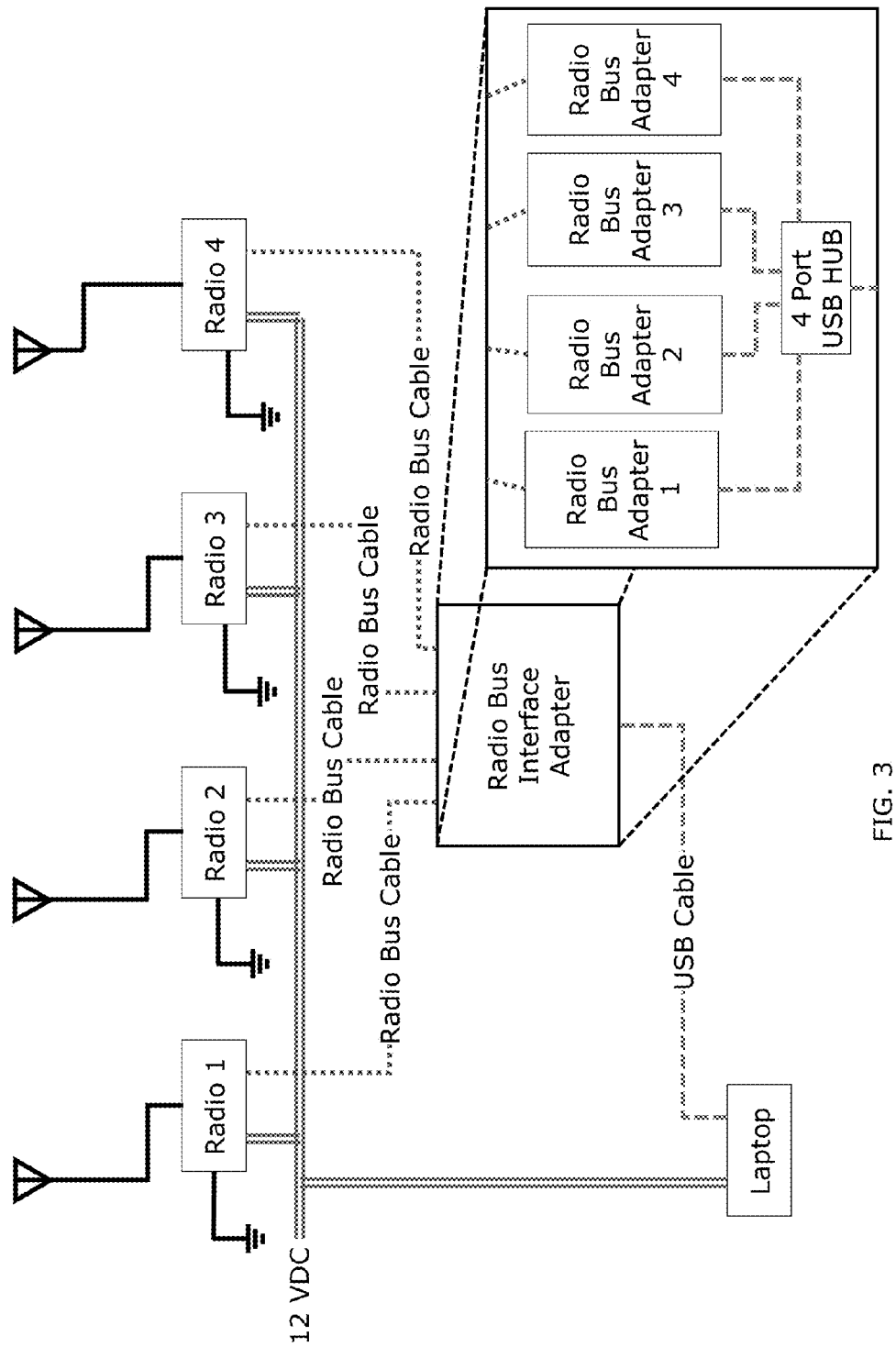
FIG. 3 is a schematic diagram showing an embodiment of a system of this disclosure in which four radios are connected to a laptop through a radio bus interface adapter.

FIG. 3 shows an example system of this disclosure in which four radios are connected to a laptop through a radio bus interface adapter. Each radio is connected to a ground and an antenna. Each of the radios is connected to a radio bus interface adapter via a radio bus cable. The radio bus interface adapter has four radio bus adapters serving the radio bus cables. The radio bus adapters converge to a four-port USB hub which sends a USB cable to the laptop. The laptop and radios are powered by a 12 volt DC power system.

Figure 4:
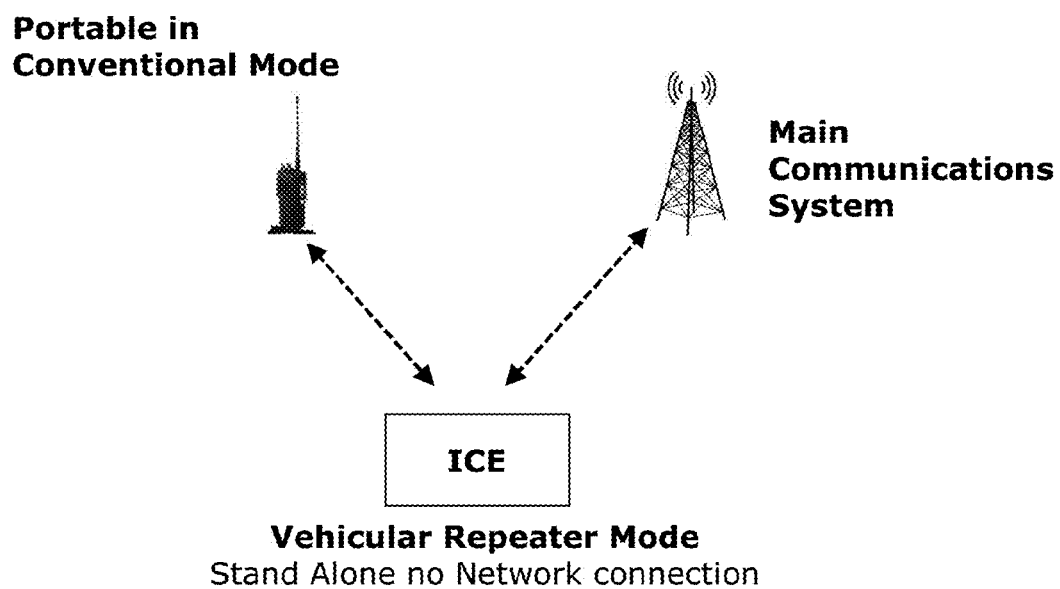
FIG. 4 is a schematic diagram showing a Vehicular Repeater Mode of the ICE system.

FIG. 4 shows a Vehicular Repeater Mode of the ICE system with a Stand-alone no Network Connection.

Figure 5:
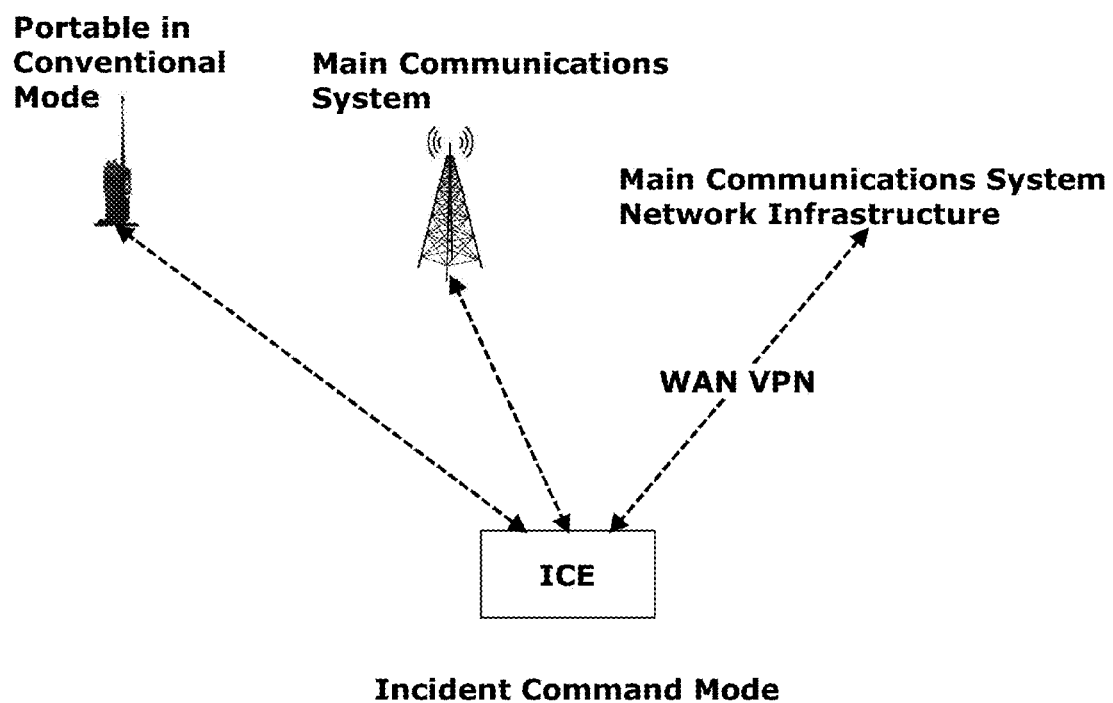
FIG. 5 is a schematic diagram showing an Incident Command Mode of the ICE system as a stand-alone system or with network connection.

FIG. 5 shows the Incident Command Mode: Stand-alone or with Network connection. If network connected other consoles can connect directly to Local Gateways.

Figure 6:
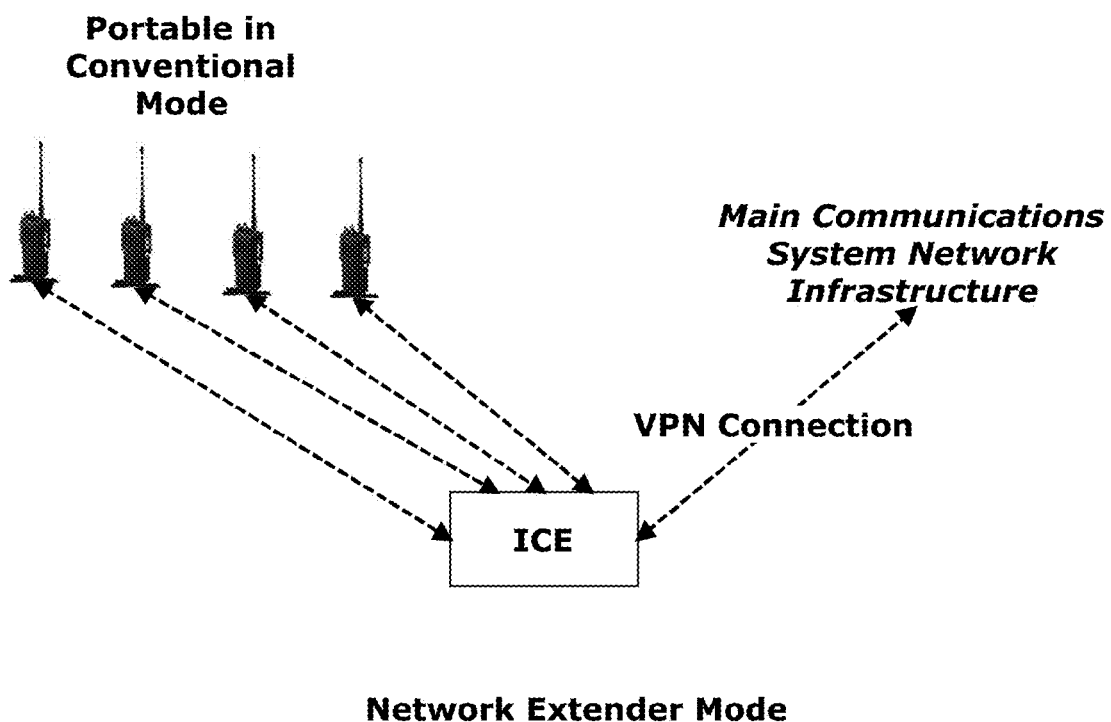
FIG. 6 is a schematic diagram showing a Network Extender Mode of the ICE system.

FIG. 6 shows the Network Extender Mode: If there was an event in an area that had limited or no access to the main communications system coverage, ICE gateways could be tied back through a wireline connection such as ISSI/CSSI, AIS, SIP/RTP, etc. and provide the main communications system with access to the local channels. If additional information like the Radio's ID and Emergency message are available locally that information could be routed back to the main communications system.

Figure 7:
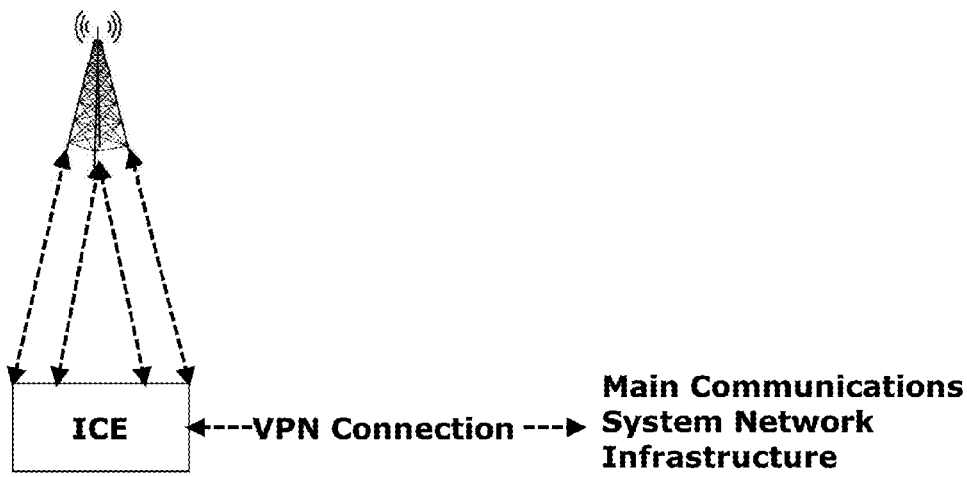
FIG. 7 is a schematic diagram showing an Orphaned Site Mode and a Switch Simulator Mode of the ICE system.

FIG. 7 shows the Orphaned Site Mode: If a site became orphaned ICE could be configured to have radios tuned to critical talk groups on the orphaned site (Like Dispatch 1, Fire 1, TAC, EMS) then the main communications system could connect to the gateways and talk to the units on the site transparently through Catalyst dispatch consoles.

FIG. 7 also shows the Switch simulator Mode: Dispatch 1 radio on the orphaned site could be patched to a Dispatch 1 radio still on the rest of the main communications system, and the users would talk through the link transparently to them, as if the system was still connected.

Figure 8:
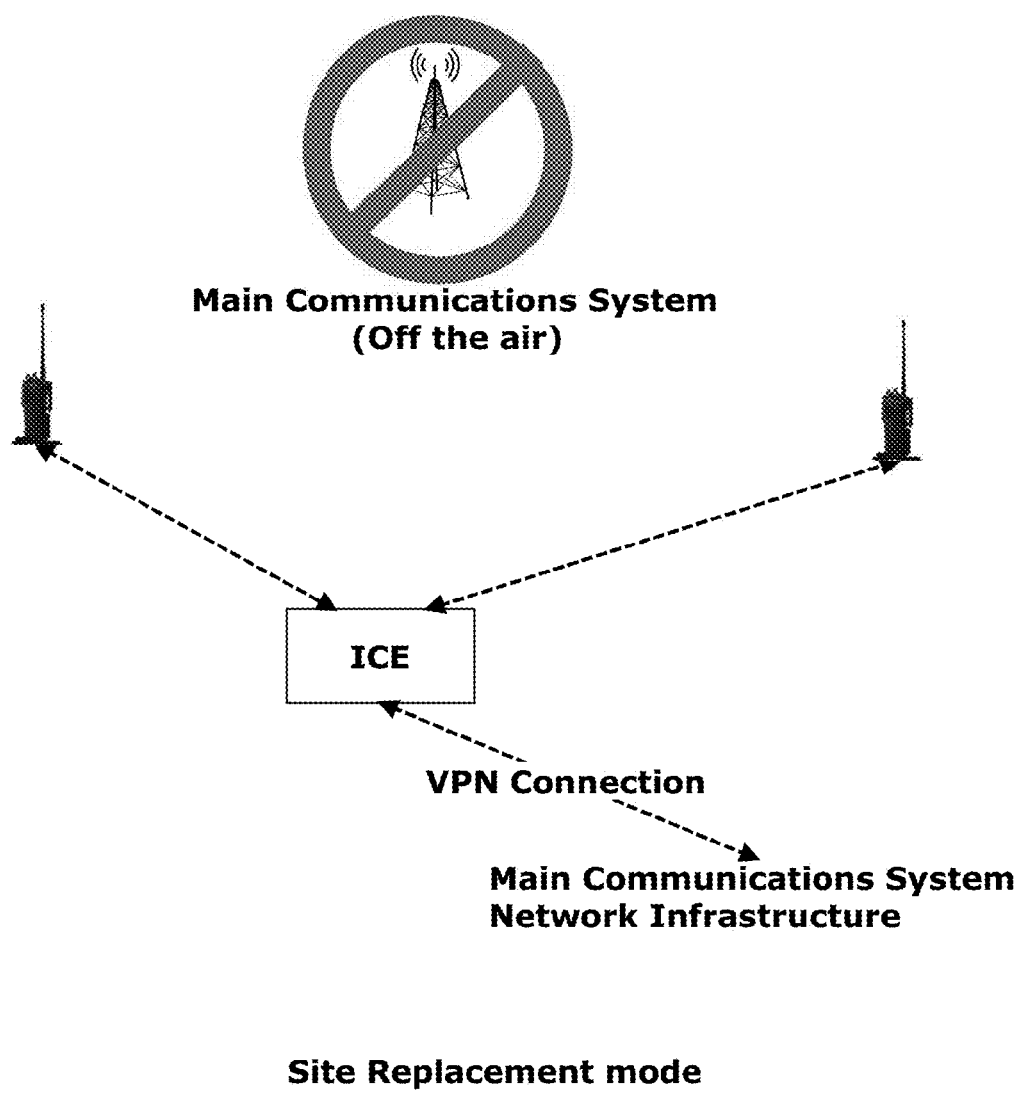
FIG. 8 is a schematic diagram showing a Site Replacement Mode of the ICE system.

FIG. 8 shows the Site Replacement mode: This would be the same as Network extender mode, except the ICE Box could be located at the tower site, on the site's antenna system, or using other antennas or at another location to get some local coverage.

Figure 9:
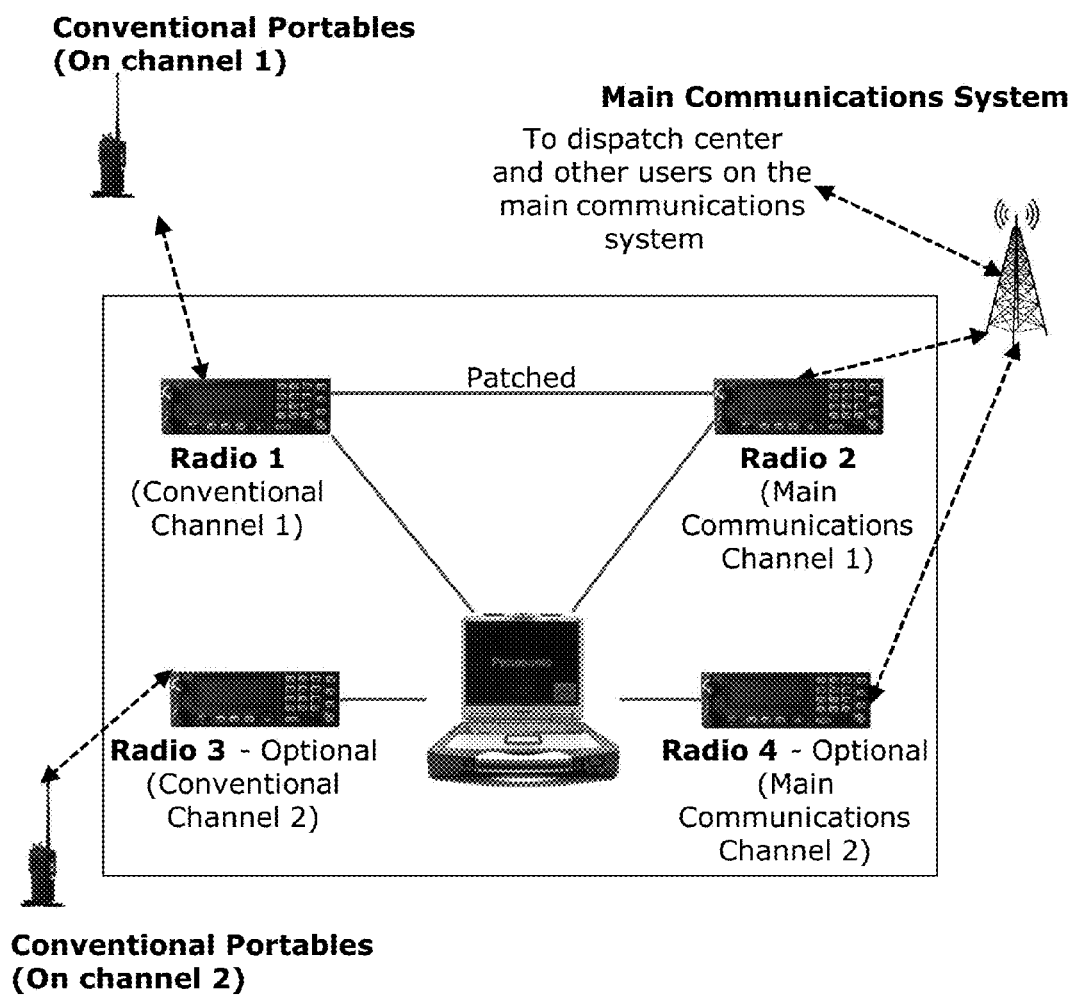
FIG. 9 is a schematic diagram showing the ICE system in Vehicular Repeater Mode.

FIG. 9 is a schematic diagram showing the ICE in Vehicular Repeater Mode: Stand-alone no network connection. ICE would patch Conventional Channel 1 to Main Communications Channel 1. The incident commander can monitor all traffic both locally and on the Main Communications System. The diagram shows that the ICE system monitors four radios. Radio 2 and Radio 4 are connected to the Main Communications System on Main Communications Channel 1 and 2, respectively and Radio 1 and Radio 3 are connected to Conventional Portables on channels 1 and 2, respectively.

Figure 10:
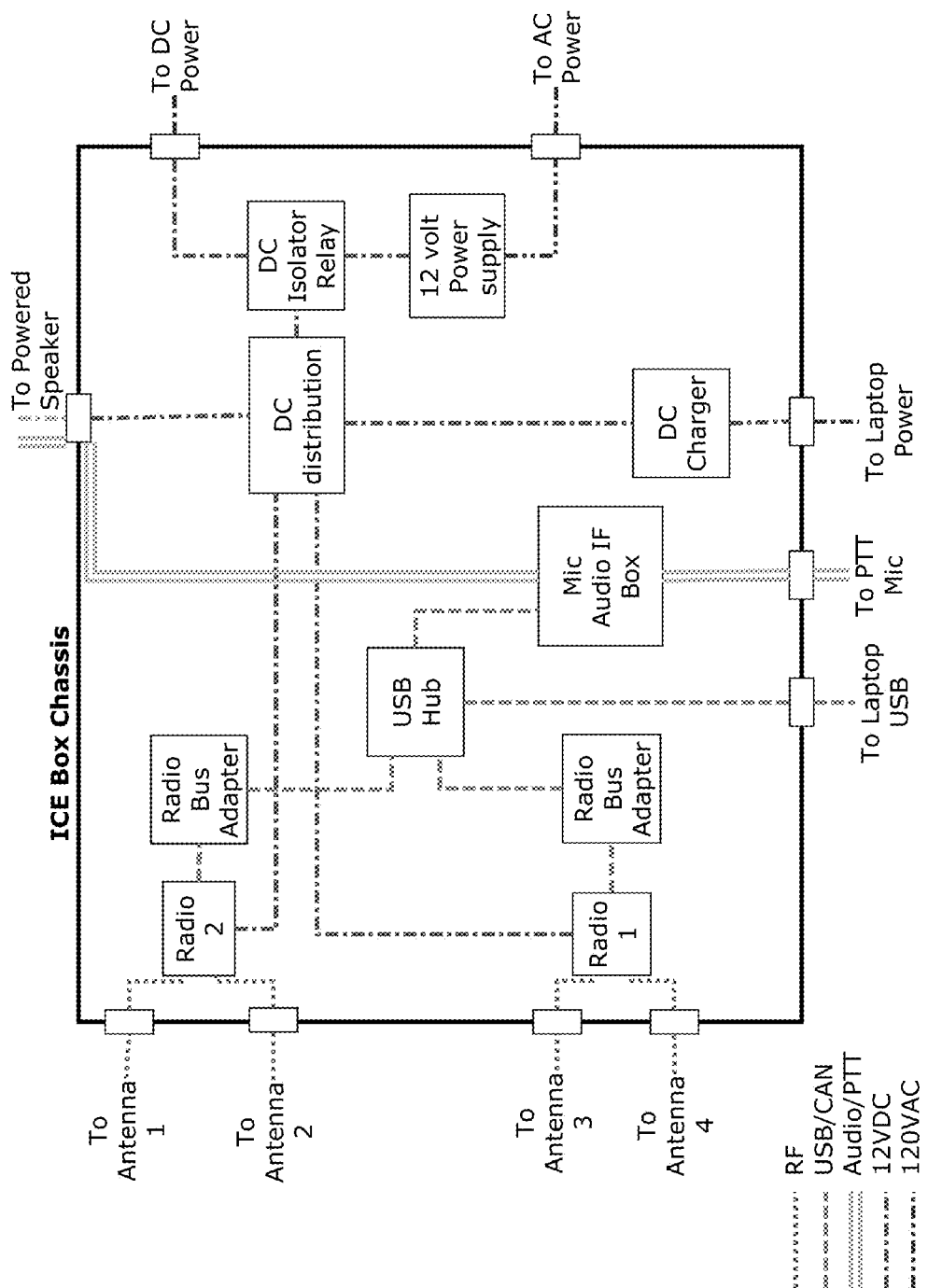
FIG. 10 is a schematic diagram showing an ICE Box Block (Chassis).

FIG. 10 is a schematic diagram showing an ICE Box Block Diagram (Chassis). Radio 1 is connected to Antenna 3 and Antenna 4 and Radio 2 are connected to Antenna 1 and Antenna 2. Radios 1 and 2 are each connected to a Radio Bus Adapter, both of which are connected to a USB hub, which is connected to laptop USB. The Mic Audio IF Box is connected to a USB hub. Radio 1 and Radio 2 are both connected to a DC distribution. The DC Distribution is connected to a DC Charger (which is connected to Laptop Power), DC Isolator Relay, and to Powered Speaker. The DC Isolator Relay is connected to a 12 volt power supply (which is connected to AC Power) and to DC Power. The Mic audio IF box is connected to the PTT Mic and Powered Speaker.

Figure 11:
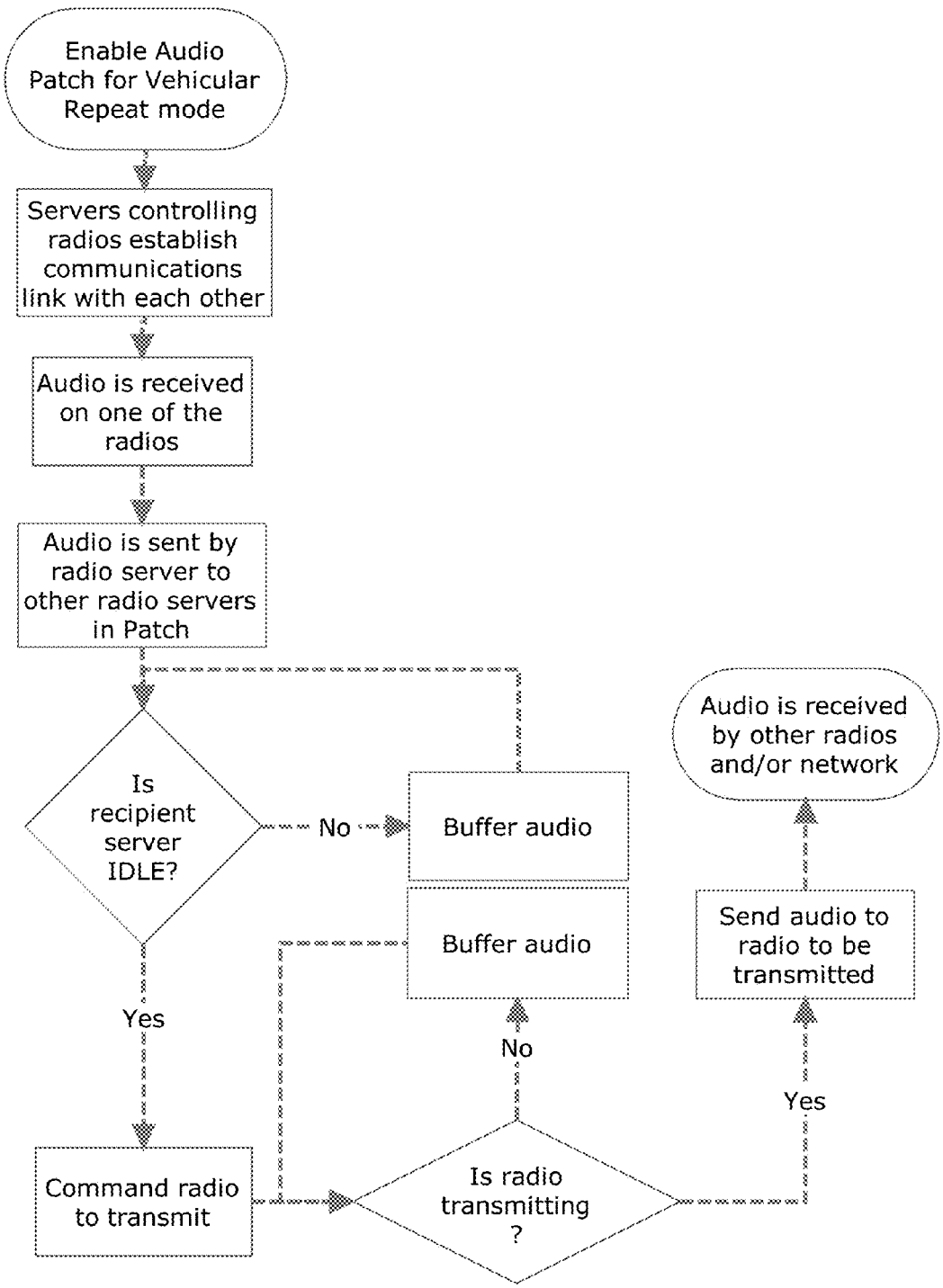
FIG. 11 is a schematic diagram showing a flow chart of the process of managing the audio flow with the ICE system.

FIG. 11 is a schematic diagram showing a flow chart of the process involved in several of the modes of the ICE. The process begins to enable audio patch for vehicular repeat mode. Then, Servers Controlling Radios establish communications link with each other. Next, Audio is received on one of the radios. Next, Audio is sent by radio sever to other radio servers in Patch. Next, the process proceeds to the decision box—Is recipient server IDLE? If NO, the audio is buffered; if YES, the radio is commanded to transmit. Next, after commanding the radio to transmit, the process proceeds to the decision box—is radio transmitting? If NO, the audio is buffered; if YES, the audio is sent to the radio to be transmitted. Finally, after sending audio to radio to be transmitted, audio is received by other radios and/or network, and the process ends.

Figure 12:
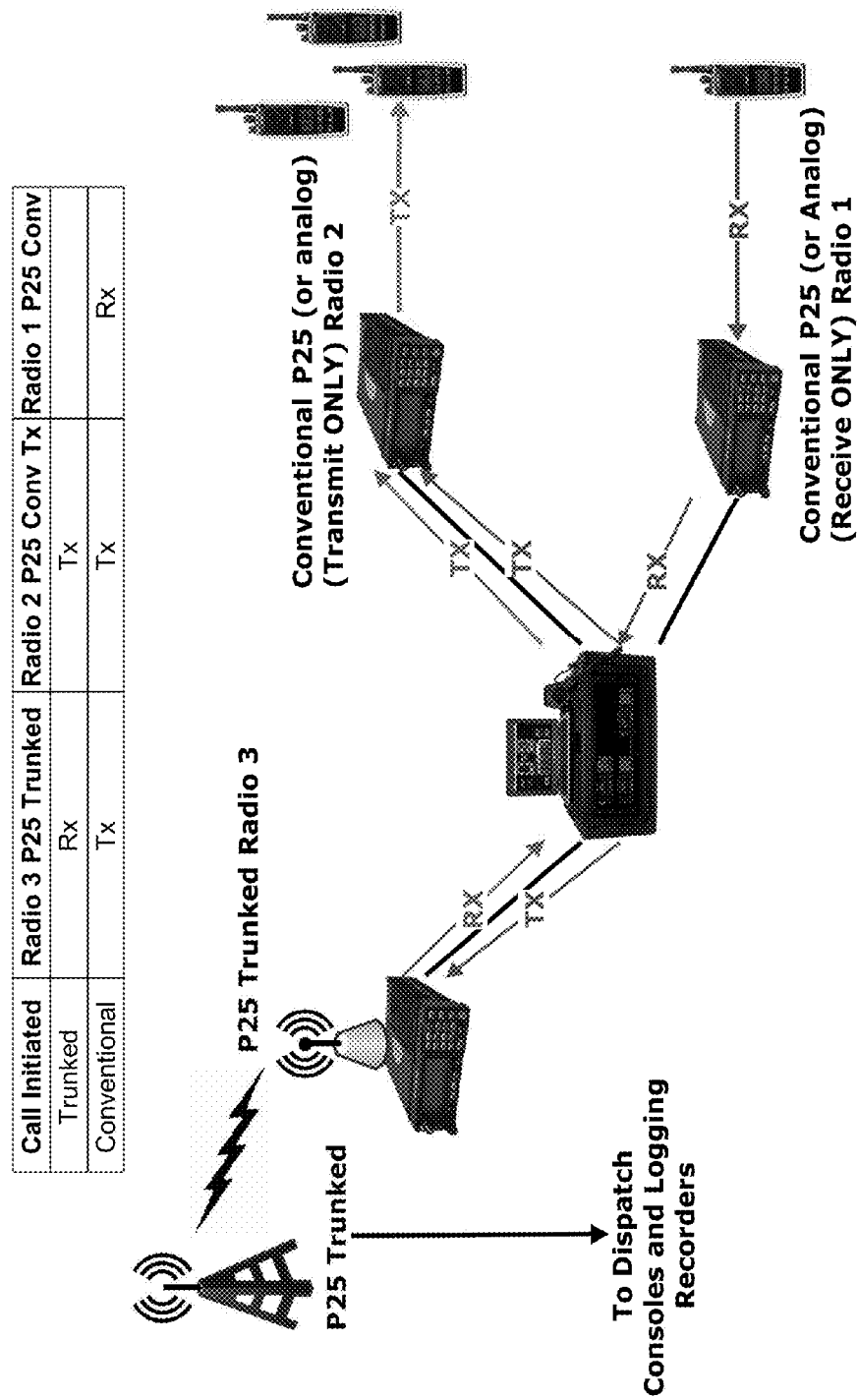
FIG. 12 is a schematic diagram showing a three radio implementation of ICE in the Vehicular Repeater Mode.

FIG. 12 is a schematic diagram showing a three radio implementation of ICE in the Vehicular Repeater Mode. All three radios are patched together via software that only allows audio to flow in one direction for radios 1 and 2 while the audio flow is bi-directional for radio 3. Further the software buffers the audio flow when a radio is not ready to transmit, insuring that critical syllables are not lost. This concept can be extended to add additional radios.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A system for managing radio communications comprising:
   a push-to-talk voice mobile radio control station component capable of supporting multiple frequency bands and multiple radio technologies;
   a computing device comprising:
      a processor;
      a computer-readable memory;
      a set of computer-executable instructions configured to provide the following features to the push-to-talk voice mobile radio control station component:
         a vehicular repeater capable of boosting a low power transmission by repeating it at a higher power and back to a main communications system,
         a local repeater capable of boosting a low power transmission by repeating it at a higher power to push-to-talk portable field radios,
         an Interoperability Gateway capable of providing interoperability between two different, otherwise incompatible communication systems, and
         a graphical user interface capable of enabling a user to reconfigure multiple multi-band, multi-protocol mobile radios, and establish a software-based patch between them;
   wherein the computing device is in operable communication with the push-to-talk mobile radio control station component providing for direct voice and data communication between the push-to-talk voice mobile radio control station and the push-to-talk portable field radios through the computer-executable instructions.

2. The system of claim 1, wherein the system is capable of both remote and local radio dispatch capability and is field deployable for incidents.

3. The system of claim 1, wherein the system is capable of providing enhanced graphics and control for the management of radio voice communications across multiple frequency bands for a multitude of communications systems using a single mobile radio.

4. The system of claim 1, wherein the system comprises an IP network interface and the system is capable of operation in stand-alone mode or linked back to an agency's main radio system and to other radio channels as needed using the Project 25 standard known as the Console Subsystem Interface (CSSI).

5. The system of claim 1, wherein the system is capable of extending network coverage of an existing centralized communications system to areas previously not covered.

6. The system of claim 1, wherein the system is capable of using a single mobile radio to allow an Incident Commander to coordinate personnel from disparate units that are using incompatible and different communication devices.

7. The system of claim 1, wherein the system comprises an IP network interface and the system is capable of providing a communications link between field personnel and a main communications system using the Digital Mobile Radio Standard known as the Application Interface Standard (AIS).

8. The system of claim 1, wherein the system is capable of routing local communications to a main radio system, thereby allowing an incident to be managed by a main dispatch center.

9. The system of claim 1, wherein the system is capable of creating network coverage via a data connection, wired or wireless, in an area that does not otherwise have coverage such that the system becomes a node on a main communication system's network, thereby allowing an incident to be managed by a main dispatch center.

10. The system of claim 1, wherein the system (using a single mobile radio) is capable of allowing a user to scan and patch between 800 MHz, 700 MHz, UHF, VHF, and Low Band.

11. The system of claim 1, wherein the system is capable of allowing a plurality of multi-band radios to be controlled from a single computing device and patched in any combination for multi-protocol platforms chosen from Project 25 (P25), EDACS, DMR, Opensky, SmartNet, MDC1200, Broadband cellular PTT, and Conventional transmissions.

12. The system of claim 1, wherein the system is capable of dynamically managing the flow of audio between routed or patched devices so syllables are not lost due to the main communications system not being ready for reception.

13. The system of claim 1, wherein the system is capable of passing digital audio without converting that audio to an analog format.

14. The system of claim 1, wherein the system is capable of recording voices locally for one week from four different multi-band radios.

15. The system of claim 1, wherein the system is capable of linking two mobile radios together to patch talk around traffic to a local trunked radio system.

16. The system of claim 1, wherein the system is capable of managing a chronological list of call data and recorded audio for both talk around and trunked calls.

17. The system of claim 1, wherein the system is capable of receiving a message from the trunked system indicating when a call has been assigned to a channel and hence it is safe to transmit and buffer the audio until the message is received and then transmitted to the trunked system.

18. The system of claim 1, wherein the system is capable of managing communications in one or more modes selected from the group consisting of Vehicular Repeater Mode, Incident Command Mode, Network Extender Mode, Orphaned Site Mode, Switch Simulator Mode, and Site Replacement Mode by selecting a preconfigured configuration file from the graphical user interface.

19. The system of claim 1, wherein the system is capable of controlling a plurality of multi-band radios from multiple, networked computing devices and patching them in any combination for multi-protocol platforms chosen from Project 25 (P25), EDACS, DMR, Opensky, SmartNet, MDC1200, Broadband Cellular Push-To-Talk (PTT), and Conventional transmissions.

20. The system of claim 1, wherein the mobile radio control station component is a single mobile radio that can be instantly switched between any of hundreds of channels on the VHF, UHF, 700 MHz, and 800 MHz bands.

21. The system of claim 1, further comprising a respond feature whereby with a single user button press the system is reconfigured as necessary to communicate back to one or more desired user(s).

22. The system of claim 1, wherein the system is capable of routing a user ID and emergency status of a conventional radio back to a main communications system.

23. The system of claim 1, wherein the system is capable of uploading locally recorded audio sessions to a main communications system when network connectivity is established with the main communications system.

24. The system of claim 1, wherein the system is capable of displaying a chronological list of voice and text message transmissions from multiple push-to-talk radios and the personnel using them.

25. The system of claim 1, wherein the system is capable of storing a chronological list of voice and text message transmissions and later transferring information from multiple push-to-talk radios and the personnel using them.

26. The system of claim 1, where using software the configuration and operation of the device in a plurality of modes such as Vehicular Repeater Mode, Incident Command Mode, Network Extender Mode, Orphaned Site Mode, Switch Simulator Mode, and Site Replacement Mode is simplified so that a lay person can make use of its powerful capabilities quickly while under stress.

* * * * *